(12) United States Patent
Schmitt et al.

(10) Patent No.: US 8,532,555 B2
(45) Date of Patent: Sep. 10, 2013

(54) RELEASE-AGENT-RESISTANT FIXING BELTS, FIXING DEVICES AND METHODS OF MAKING FIXING BELTS

(75) Inventors: Sandra L. Schmitt, Williamson, NY (US); Augusto E. Barton, Webster, NY (US); Kevin H. Taft, Williamson, NY (US)

(73) Assignee: Xerox Corporation, Norwalk, CT (US)

( * ) Notice: Subject to any disclaimer, the term of this patent is extended or adjusted under 35 U.S.C. 154(b) by 477 days.

(21) Appl. No.: 12/878,633

(22) Filed: Sep. 9, 2010

(65) Prior Publication Data

US 2012/0063824 A1    Mar. 15, 2012

(51) Int. Cl.
    *G03G 15/20*    (2006.01)
(52) U.S. Cl.
    USPC ........................................... 399/333; 156/137
(58) Field of Classification Search
    USPC .................... 399/329, 333; 156/137
    See application file for complete search history.

(56) References Cited

U.S. PATENT DOCUMENTS

2008/0037069 A1    2/2008    Mestha et al.

OTHER PUBLICATIONS

Martin Franklin Zess; "Pressure Rolls, Apparatuses Useful in Printing and Methods of Making Pressure Rolls"; U.S. Appl. No. 12/549,805, filed Aug. 28, 2009.

*Primary Examiner* — Walter L Lindsay, Jr.
*Assistant Examiner* — Ruth Labombard
(74) *Attorney, Agent, or Firm* — Ronald E. Prass, Jr.; Prass LLP

(57) ABSTRACT

Fixing belts, fixing devices and methods of making fixing belts are provided. An exemplary embodiment of the fixing belts includes an inner layer comprising a first surface forming an inner surface of the fixing belt and a second surface opposite to the first surface, the inner layer comprising a first polymer; an intermediate layer overlying the second surface of the inner layer, the intermediate layer including a third surface, a first end face and a second end face opposite to the first end face, the intermediate layer comprising silicone rubber; and an outer layer including a fourth surface forming an outer surface of the fixing belt, the outer layer overlying the third surface, the first end face, the second end face and portions of the second surface disposed outward from the first end face and second end face, the outer layer comprising a second polymer. The outer layer seals and protects the intermediate layer from exposure to a liquid release agent applied to the fourth surface.

19 Claims, 3 Drawing Sheets

RELEASE-AGENT-RESISTANT FIXING BELTS, FIXING DEVICES AND METHODS OF MAKING FIXING BELTS

BACKGROUND

In some printing apparatuses, toner can be applied to substrates to form images. The images can be heated while being subjected to pressure by opposed fixing members to fix the toner to the substrates. In such printing apparatuses, a release agent may be applied to one of the fixing members to reduce adherence of marking material to the fixing component.

It would be desirable to provide fixing belts, fixing devices and methods of fixing marking material using the fixing belts, where the fixing belts provide resistance to release agents.

SUMMARY

Fixing belts, fixing devices and methods of making fixing belts for fixing devices are provided. An exemplary embodiment of the fixing belts can comprise an inner layer comprising a first surface forming an inner surface of the fixing belt and a second surface opposite to the first surface, the inner layer comprising a first polymer; an intermediate layer overlying the second surface of the inner layer, the intermediate layer comprising a third surface, a first end face and a second end face opposite to the first end face, the intermediate layer comprising silicone rubber; and an outer layer comprising a fourth surface forming an outer surface of the fixing belt, the outer layer overlying the third surface, the first end face, the second end face and portions of the second surface disposed outward from the first end face and second end face, the outer layer comprising a second polymer. The outer layer seals and protects the intermediate layer from exposure to a liquid release agent applied to the fourth surface.

DRAWINGS

DETAILED DESCRIPTION

Figure 1:
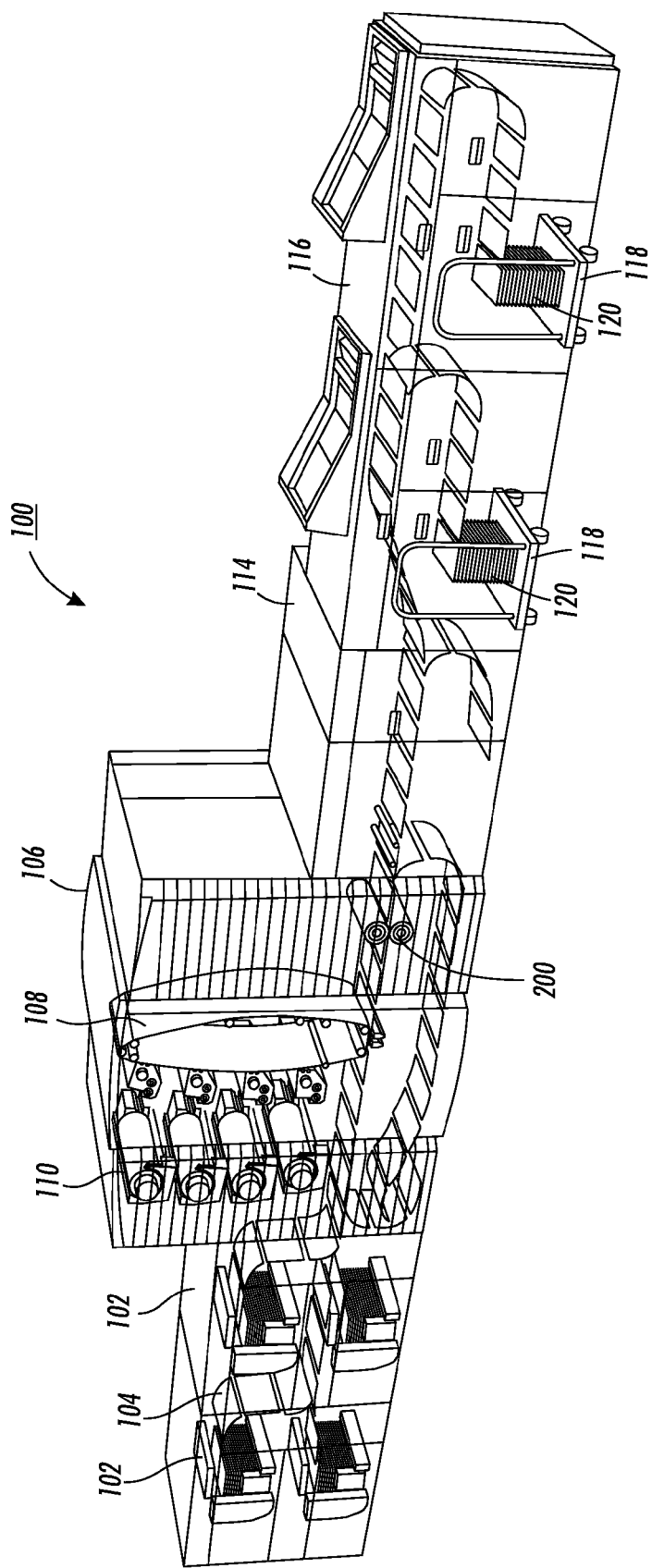
FIG. 1 illustrates an exemplary embodiment of printing apparatus.

The disclosed embodiments include fixing belts. An exemplary embodiment of the fixing belts can comprise an inner layer comprising a first surface forming an inner surface of the fixing belt and a second surface opposite to the first surface, the inner layer comprising a first polymer; an intermediate layer overlying the second surface of the inner layer, the intermediate layer comprising a third surface, a first end face and a second end face opposite to the first end face, the intermediate layer comprising silicone rubber; and an outer layer comprising a fourth surface forming an outer surface of the fixing belt, the outer layer overlying the third surface, the first end face, the second end face and portions of the second surface disposed outward from the first end face and second end face, the outer layer comprising a second polymer. The outer layer seals and protects the intermediate layer from exposure to a liquid release agent applied to the fourth surface.

The disclosed embodiments further include fixing devices. An exemplary embodiment of the fixing devices can comprise a first roll; a fixing member including an outer surface; and a fixing belt entrained on at least the first roll. The fixing belt comprises an inner layer comprising a first surface forming an inner surface of the fixing belt contacting the first roll and a second surface opposite to the first surface, the inner layer comprising a first polymer; an intermediate layer overlying the second surface of the inner layer, the intermediate layer comprising a third surface, a first end face and a second end face opposite to the first end face, the intermediate layer comprising silicone rubber; and an outer layer comprising a fourth surface forming an outer surface of the fixing belt, the fourth surface forming a nip with the outer surface of the fixing member, the outer layer overlying the third surface, the first end face, the second end face and portions of the second surface disposed outward from the first end face and second end face, the outer layer comprising a second polymer. The outer layer seals and protects the intermediate layer from exposure to a liquid release agent applied to the fourth surface.

The disclosed embodiments further include methods of making fixing belts. An exemplary embodiment of the methods can comprise applying an intermediate layer comprising silicone rubber over a second surface of an inner layer, the inner layer comprising a first surface opposite to the second surface, the first surface forming an inner surface of the fixing belt, the intermediate layer comprising a third surface, a first end face and a second end face opposite to the first end face; applying an outer layer comprising a second polymer over the third surface, the first end face, the second end face and portions of the second surface disposed outward from the first end face and second end face, the outer layer comprising a fourth surface forming an outer surface of the fixing belt; and trimming the fixing belt by cutting through the outer layer overlying the portions of the second surface disposed outward from the first end face and second end face and cutting through the inner layer. The outer layer seals and protects the intermediate layer from exposure to a liquid release agent applied to the fourth surface.

In some printing processes, images are formed on substrates using a marking material comprising dry toner. These printing processes may utilize a contact fixing device including fixing members, which form a fixing nip. In these fixing devices, a toner image formed on a substrate is fixed or fused by applying sufficient thermal energy and pressure to the substrate and toner image by contact with the fixing members at the fixing nip.

The fixing of toner onto a substrate can be achieved using high-temperature, relatively-low pressure conditions in such contact fixing devices. These devices may utilize a continuous fixing belt entrained on rolls. The fixing belt can have a multi-layer structure, including an outer layer having an outer surface composed of a polymer that contacts substrates at the fixing nip. In these fixing devices, the polymer may be exposed to surface temperatures of about 150° C. to 200° C., for example. A liquid release agent may be applied to the polymer forming the outer surface of the fixing belt to reduce adherence of substrates and marking material applied to the substrates to the outer surface, to thereby reduce offset and promote stripping.

It has been noted, however, that the release agent applied to the fixing belt in the fixing devices can cause the layers of the multi-layer fixing belt structure to peel when the fixing belt is exposed to high temperatures with the axial end faces of the fixing belt exposed to the release agent, because the release agent penetrates into the fixing belt and makes the intermediate layer swell, which causes the outer layer to peel off. As a result, the fixing belt can fail prematurely.

In light of these observations, multi-layer fixing belts for fixing devices are provided that provide resistance to peeling of the layers when the fixing belts are exposed to a release agent.

As used herein, the term "printing apparatus" can encompass various types of apparatuses that are used to form images on substrates with marking materials. These apparatuses can include printers, copy machines, facsimile machines, multi-function machines, and the like.

FIG. 1 illustrates an exemplary printing apparatus 100 as disclosed in U.S. Patent Application Publication No. 2008/0037069, which is incorporated herein by reference in its entirety. The printing apparatus 100 can be used to produce prints from various types of substrate, such as coated or un-coated (plain) paper sheets. The printing apparatus 100 includes two feeder modules 102 arranged in series, a printer module 106 (marking device) adjacent the feeder modules 102, an inverter module 114 adjacent the printer module 106, and two stacker modules 116 adjacent the inverter module 114.

In the printing apparatus 100, the feeder modules 102 feed substrate to the printer module 106. In the printer module 106, marking material comprising toner is transferred from the developer stations 110 to a photoreceptor belt 108 to form toner images on the photoreceptor belt 108. The toner images are transferred to one side of respective substrates 104 fed through the paper path. The substrates are advanced through a fixing device 200 to fix the toner images onto the substrates. The inverter module 114 manipulates substrates exiting the printer module 106 by either passing the substrates through to the stacker modules 116, or inverting and returning the substrates to the printer module 106. In the stacker modules 116, the substrates are loaded onto stacker carts 118 to form stacks 120.

Figure 2:
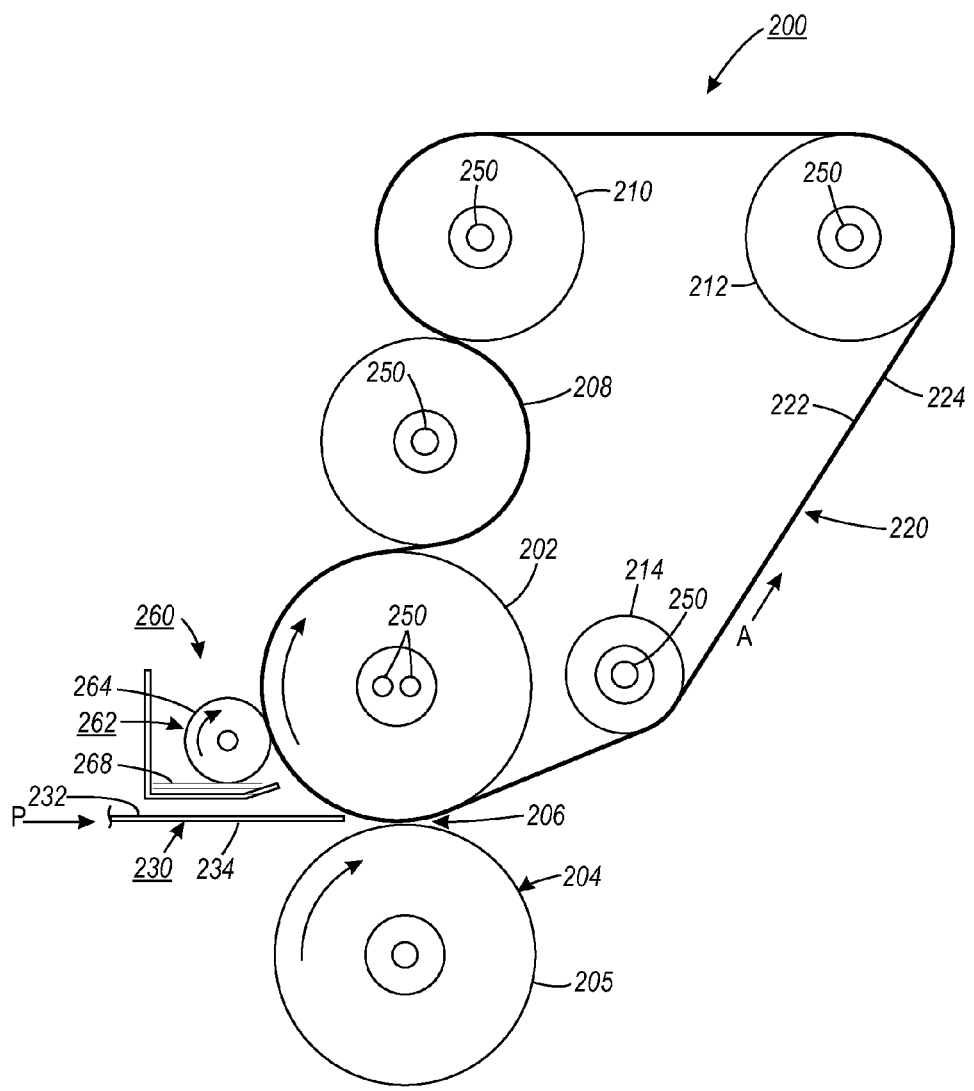
FIG. 2 depicts an exemplary embodiment of a fixing device including a release-agent-resistant fixing belt.

FIG. 2 illustrates an exemplary embodiment of the fixing device 200. Embodiments of the fixing device 200 include two or more rolls on which a continuous fixing belt is entrained. The fixing device 200 shown in FIG. 2 includes a fixing roll 202 and rolls 208, 210, 212 and 214 on which an endless (continuous) fixing belt 220 is entrained, and a pressure roll 204. The fixing belt 220 has an inner surface 222 and an opposite outer surface 224. The outer surface 224 of the fixing belt 220 and the outer surface 205 of the pressure roll 204 forms a nip 206. The fixing belt 220 is driven to rotate in the counter-clockwise direction indicated by arrow A through the nip 206.

In the illustrated embodiment of the fixing device 200, each of the fixing roll 202 and the rolls 208, 210, 212 and 214 is heated. In other embodiments, one or more of the rolls 208, 210, 212 and 214 may not be heated. As shown, the fixing roll 202 and rolls 208, 210, 212 and 214 each include an internal heating element 250, such as a tungsten quartz lamp, quartz rod or the like. The heating elements 250 are powered to heat the fixing belt 220.

The fixing device 200 further includes a release agent applicator system 260 for applying a liquid release agent to the outer surface 224 of the fixing belt 220. A substrate 230, which has a front surface 232 and a back surface 234, is shown entering the nip 206. The release agent composition is effective to reduce adherence of marking material on the front surface 232 to the outer surface 224 and to enhance mechanical stripping of the substrate 230 from the outer surface 224 after the substrate 230 passes through the nip 206. The release agent comprises silicone oil, and may also contain additional additives.

The illustrated release agent applicator system 260 includes an applicator roll 262 having an outer surface 264. The outer surface 264 contacts the outer surface 224 of the fixing belt 220 to transfer release agent to the outer surface 224. Release agent may be collected as depicted at 268. The applicator roll 262 is rotatable at a controlled speed to transfer the release agent to the outer surface 224 of the fixing belt 220.

During operation of the fixing device 200, the substrate 230, which may be, e.g., a paper sheet or web, is fed to the nip 206. At the nip 206, the outer surface 224 of the fixing belt 220 contacts the front surface 232 of the substrate 230 and marking material on the front surface 232, and the back surface 234 of the substrate 230 contacts the outer surface 205 of the pressure roll 204. The fixing belt 220 and the pressure roll 204 supply sufficient thermal energy and pressure to the substrate 230 and marking material to fix or fuse the marking material onto the front surface 232.

Figure 3:
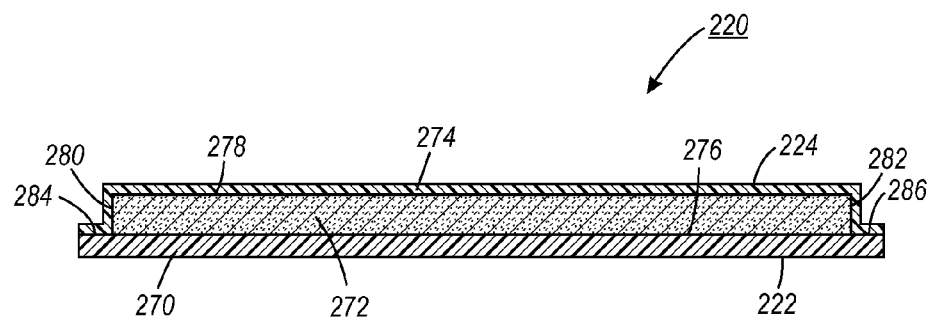
FIG. 3 depicts an exemplary embodiment of the release-agent-resistant fixing belt.

FIG. 3 depicts an exemplary embodiment of the fixing belt 220. As shown, the fixing belt 220 includes an inner layer 270, an intermediate layer 272 overlying the surface 276 of the inner layer 270, and an outer layer 274 overlying the surface 278 of the intermediate layer 272. Although each of the inner layer 270, intermediate layer 272 and outer layer 274 is depicted as being a single layer, in embodiments, each of these layers may include two or more overlying layers in the thickness dimension of the fixing belt 220. The inner layer 270 includes the inner surface 222 and the outer layer 274 includes the outer surface 224 of the fixing belt 220. Typically, the inner layer 270 may have a thickness of about 50 µm to about 100 µm, the intermediate layer 272 may have a thickness of about 150 µm to about 500 µm, and the outer layer 272 may have a thickness of about 15 µm to about 40 µm. The fixing belt 220 may have a width of about 350 mm to about 450 mm.

In embodiments, the inner layer 270 is comprised of a polymer that has a sufficiently-high modulus of elasticity to provide a sufficiently-high circumferential stiffness to allow the belt to be tensioned and undergo a small circumferential elongation when installed on the supporting rolls of the fixing device 200. Exemplary materials that can provide these properties to the inner layer 270 are the polyimides. An exemplary polyimide that can be used to form the inner layer 270 is KAPTON® polyimide available from E.I. du Pont de Nemours and Company. The inner layer 270 may be comprised entirely of the polyimide, or may also contain one or more additional materials, such as additives, to provide desired chemical, mechanical and/or electrical properties in the inner layer 270.

In embodiments, the intermediate layer 272 comprises silicone rubber. The intermediate layer 272 may be comprised entirely of silicone rubber, or may also contain one or more additional materials, such as additives, to provide desired chemical, mechanical and/or electrical properties in the intermediate layer 272. The intermediate layer 272 includes opposed axial end faces 280, 282.

The outer layer 274 is comprised of a polymer that provides sufficient flexibility and abrasion resistance in the fixing belt 220. The polymer can be, e.g., a fluoropolymer. An exemplary group of polymers that provides these properties is the fluoroelastomers, such as VITON® fluoroelastomer available from E. I. du Pont de Nemours and Company Performance Elastomers. In other embodiments, the outer layer 274 may comprise a polymer that provides the properties of low surface energy, high abrasion resistance, low modulus of elasticity (low stiffness), and a coefficient of friction sufficiently low to reduce adherence of marking materials, such as toner, to the outer surface 224. An exemplary material is TEFLON® PTFE (polytetrafluoroethylene) available from E. I. du Pont de Nemours and Company. The outer layer 274 may be comprised entirely of a fluoropolymer, or may also contain one or more additional materials, such as additives, to provide desired chemical, mechanical and/or electrical properties in the outer layer 274.

As shown in FIG. 3, the outer layer 274 of the fixing belt 220 entirely overlies (covers) the surface 278 and the opposed end faces 280, 282 of the intermediate layer 272, and also overlies the end portions 284, 286 of the surface 276 of the inner layer 270, which are disposed outwardly from the end faces 280, 282, respectively. The outer layer 274 protects the end faces 280, 282 and end portions 284, 286 from exposure to (being contacted by) the liquid release agent when applied to the outer surface 224. By also protecting (sealing) the end faces 280, 282 of the intermediate layer 272 from this exposure to the release agent, swelling and pre-mature peeling of the outer layer 274 from the intermediate layer 272 can be prevented to increase the service life of the fixing belt 220.

Figure 4:
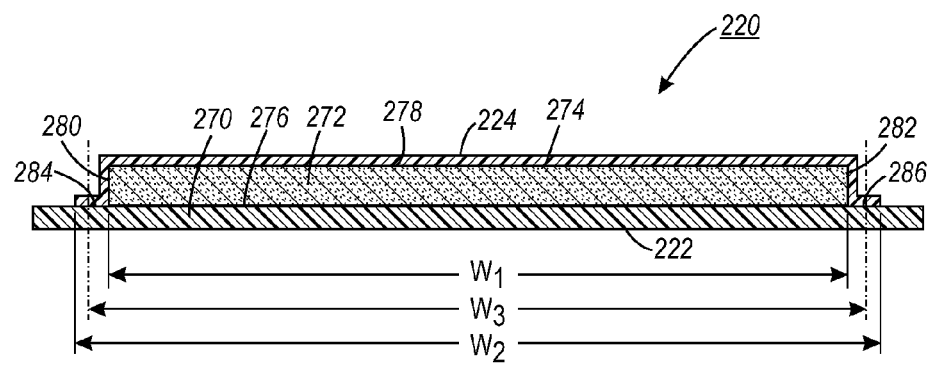
FIG. 4 illustrates an exemplary method of making the fixing belt of FIG. 3.

An exemplary method of making an embodiment of the fixing belt 220 will be described with reference to FIG. 4. The surface 276 of a continuous polyimide inner layer 270 is cleaned. Then, a first adhesive is applied to the cleaned surface 276. Silicone rubber is applied to the surface 276 by a flow coating process, or the like, to form the intermediate layer 272, which has a width $W_1$. The silicone rubber intermediate layer 272 is then cured and the surface 278 and the end faces 280, 282 are finished. A second adhesive is applied to the finished surface 278 and end faces 280, 282, and to the exposed end portions of the surface 276 of the inner layer 270. Then, VITON® fluoroelastomer is applied by a flow coating process, or the like, to form the outer layer 274. As shown, the outer layer 274 is applied over the surface 278, over the end faces 280, 282 and over the end portions of the surface 276 of the inner layer 270 disposed outward from the end faces 280, 282, to completely cover the coated surfaces. The outer layer 274 is coated in front of and past the silicone rubber to seal the silicone rubber of the intermediate layer 272. As shown, the VITON® fluoroelastomer has a width $W_2$. Then, the VITON® fluoroelastomer is cured. The second adhesive provides adhesion of the VITON® fluoroelastomer to the silicone rubber of the intermediate layer 272 and also to the polyimide of the inner layer 270. As shown, the fixing belt 220 is trimmed by cutting through the VITON® fluoroelastomer where it is coated directly to the inner layer 270 and also cutting through the inner layer 270 to produce the fixing belt 220 having a final width $W_3$. In the resulting fixing belt 220, the silicone rubber is sealed under the VITON®. In the exemplary fixing belt 220, the inner layer 270 has a thickness of about 75 µm, the intermediate layer 272 has a thickness of about 180 µm, and the outer layer 274 has a thickness of about 20 µm.

Results of experimental testing have shown that a fixing belt including a polyimide inner layer, a silicone rubber intermediate layer on the inner layer, and a VITON® outer layer on the intermediate layer, in which the axial end faces of the silicone rubber layer were exposed to silicone oil release agent at high temperatures in a fixing device will result in the VITON® outer layer peeling off of the silicone rubber. Under the same test conditions, experimental results have shown that a fixing belt including the same three layers, but with the axial end faces of the silicone rubber not being exposed, but being covered by the VITON® outer layer coated over the silicone rubber axial end faces, will not show indications of the VITON® outer layer peeling off. No indications of VITON® outer layer peel-off were observed on this fixing belt even after life tests that will account for about twice the expected life of the fixing belt.

It will be appreciated that various ones of the above-disclosed, as well as other features and functions, or alternatives thereof, may be desirably combined into many other different systems or applications. Also, various presently unforeseen or unanticipated alternatives, modifications, variations or improvements therein may be subsequently made by those skilled in the art, which are also intended to be encompassed by the following claims.

What is claimed is:

1. A fixing belt for a fixing device, comprising:
an inner layer comprising a first surface forming an inner surface of the fixing belt and a second surface opposite to the first surface, the inner layer comprising a first polymer;
an intermediate layer overlying the second surface of the inner layer, the intermediate layer comprising a third surface, a first end face and a second end face opposite to the first end face, the intermediate layer comprising silicone rubber; and
an outer layer comprising a fourth surface forming an outer surface of the fixing belt, the outer layer overlying the third surface, the first end face, the second end face and portions of the second surface disposed outward from the first end face and second end face, the outer layer comprising a second polymer, wherein the outer layer seals and protects the intermediate layer from exposure to a liquid release agent applied to the fourth surface.

2. The fixing belt of claim 1, wherein:
the first polymer is a polyimide; and
the second polymer is a fluoroelastomer.

3. The fixing belt of claim 1, wherein:
the inner layer comprises a polyimide;
the intermediate layer comprises silicone rubber; and
the outer layer comprises a fluoroelastomer.

4. The fixing belt of claim 1, wherein the outer layer is adhered to the third surface, the first end face, the second end face and the portions of the second surface disposed outward from the first end face and second end face with the same adhesive.

5. The fixing belt of claim 1, wherein:
the inner layer has a thickness of 50 µm to 100 µm;
the intermediate layer has a thickness of 150 µm to 500 µm; and
the outer layer has a thickness of 15 µm to 40 µm.

6. The fixing belt of claim 1, wherein the fixing belt is continuous.

7. A method of making a fixing belt for a fixing device, comprising:
applying an intermediate layer comprising silicone rubber over a second surface of an inner layer, the inner layer comprising a first surface opposite to the second surface, the first surface forming an inner surface of the fixing belt, the intermediate layer comprising a third surface, a first end face and a second end face opposite to the first end face;
applying an outer layer comprising a second polymer over the third surface, the first end face, the second end face and portions of the second surface disposed outward from the first end face and second end face, the outer layer comprising a fourth surface forming an outer surface of the fixing belt, and
trimming the fixing belt by cutting through the outer layer overlying the portions of the second surface disposed outward from the first end face and second end face and cutting through the inner layer, wherein the outer layer seals and protects the intermediate layer from exposure to a liquid release agent applied to the fourth surface.

8. The method of claim 7, wherein:
the first polymer is a polyimide; and
the second polymer is a fluoroelastomer.

9. The method of claim 7, wherein:
the inner layer consists comprises a polyimide;
the intermediate layer comprises silicone rubber; and
the outer layer comprises a fluoroelastomer.

10. The method of claim 7, wherein:
the intermediate layer is applied over the second surface of the inner layer by flow coating; and
the outer layer is applied over the third surface, the first end face, the second end face and the portions of the second surface disposed outward from the first end face and second end face by flow coating.

11. The method of claim 7, wherein the fixing belt is continuous.

12. The method of claim 7, further comprising adhering the outer layer to the third surface, the first end face, the second end face and the portions of the second surface disposed outward from the first end face and second end face with the same adhesive.

13. A fixing device, comprising:
a first roll;
a fixing member including an outer surface; and
a fixing belt entrained on at least the first roll, the fixing belt comprising:
an inner layer comprising a first surface forming an inner surface of the fixing belt contacting the first roll and a second surface opposite to the first surface, the inner layer comprising a first polymer;
an intermediate layer overlying the second surface of the inner layer, the intermediate layer comprising a third surface, a first end face and a second end face opposite to the first end face, the intermediate layer comprising silicone rubber; and
an outer layer comprising a fourth surface forming an outer surface of the fixing belt, the fourth surface forming a nip with the outer surface of the fixing member, the outer layer overlying the third surface, the first end face, the second end face and portions of the second surface disposed outward from the first end face and second end face, the outer layer comprising a second polymer, wherein the outer layer seals and protects the intermediate layer from exposure to a liquid release agent applied to the fourth surface.

14. The fixing device of claim 13, wherein:
the first polymer is a fluoroelastomer; and
the second polymer is a polyimide.

15. The fixing device of claim 13, wherein:
the inner layer comprises a fluoroelastomer;
the intermediate layer comprises silicone rubber; and
the outer layer comprises a polyimide.

16. The fixing device of claim 13, wherein:
the inner layer has a thickness of 50 μm to 100 μm;
the intermediate layer has a thickness of 150 μm to 500 μm; and
the outer layer has a thickness of 15 μm to 40 μm.

17. The fixing device of claim 13, wherein the outer layer is adhered to the third surface, the first end face, the second end face and the portions of the second surface disposed outward from the first end face and second end face with the same adhesive.

18. The fixing device of claim 13, wherein:
the fixing belt is continuous and is entrained on at least a second roll;
the fixing member comprises a third roll; and
at least the first roll is heated.

19. The fixing device of claim 13, further comprising a release agent applicator device for applying the liquid release agent, which comprises silicone oil, to the fourth surface of the fixing belt.

* * * * *